United States Patent [19]

Dunlap

[11] 4,152,006
[45] May 1, 1979

[54] TOWING APPARATUS

[76] Inventor: Ward W. Dunlap, P. O. Box 8414, Charlotte, N.C. 28208

[21] Appl. No.: 836,315

[22] Filed: Sep. 26, 1977

[51] Int. Cl.² .......................... B60D 1/14; B62D 53/08
[52] U.S. Cl. .................... 280/402; 280/415 A; 414/563
[58] Field of Search ............... 280/402, 425 R, 415 B, 280/415 R, 503; 214/86 A; 212/124

[56] References Cited

U.S. PATENT DOCUMENTS

| | | | |
|---|---|---|---|
| 2,283,443 | 5/1942 | Klein | 214/86 A |
| 2,449,146 | 9/1948 | Ryan | 214/86 A |
| 3,158,266 | 11/1964 | Manaugh | 280/402 X |
| 3,716,152 | 2/1973 | Sloter | 280/402 X |
| 3,810,663 | 5/1974 | Berends | 280/425 R |
| 3,977,546 | 8/1976 | Loza | 214/86 A |

FOREIGN PATENT DOCUMENTS 1087459  8/1960  Fed. Rep. of Germany ....... 280/415 B Primary Examiner—John A. Pekar
Attorney, Agent, or Firm—Bell, Seltzer, Park & Gibson

[57] ABSTRACT

A secondary towing apparatus particularly suited for a towing vehicle having a conventional fifth wheel coupling device, which towing vehicle is to be made convertible from towing a trailer to towing an alternate type vehicle. The towing apparatus comprises a boom to be mounted on the chassis of the towing vehicle for movement from a stowed position to a towing position, the boom when in the stowed position accommodating normal operation of the coupling device and the boom when in the towing position accommodating towing engagement with the alternate vehicle, and a brace member to secure the boom in the towing position.

16 Claims, 9 Drawing Figures

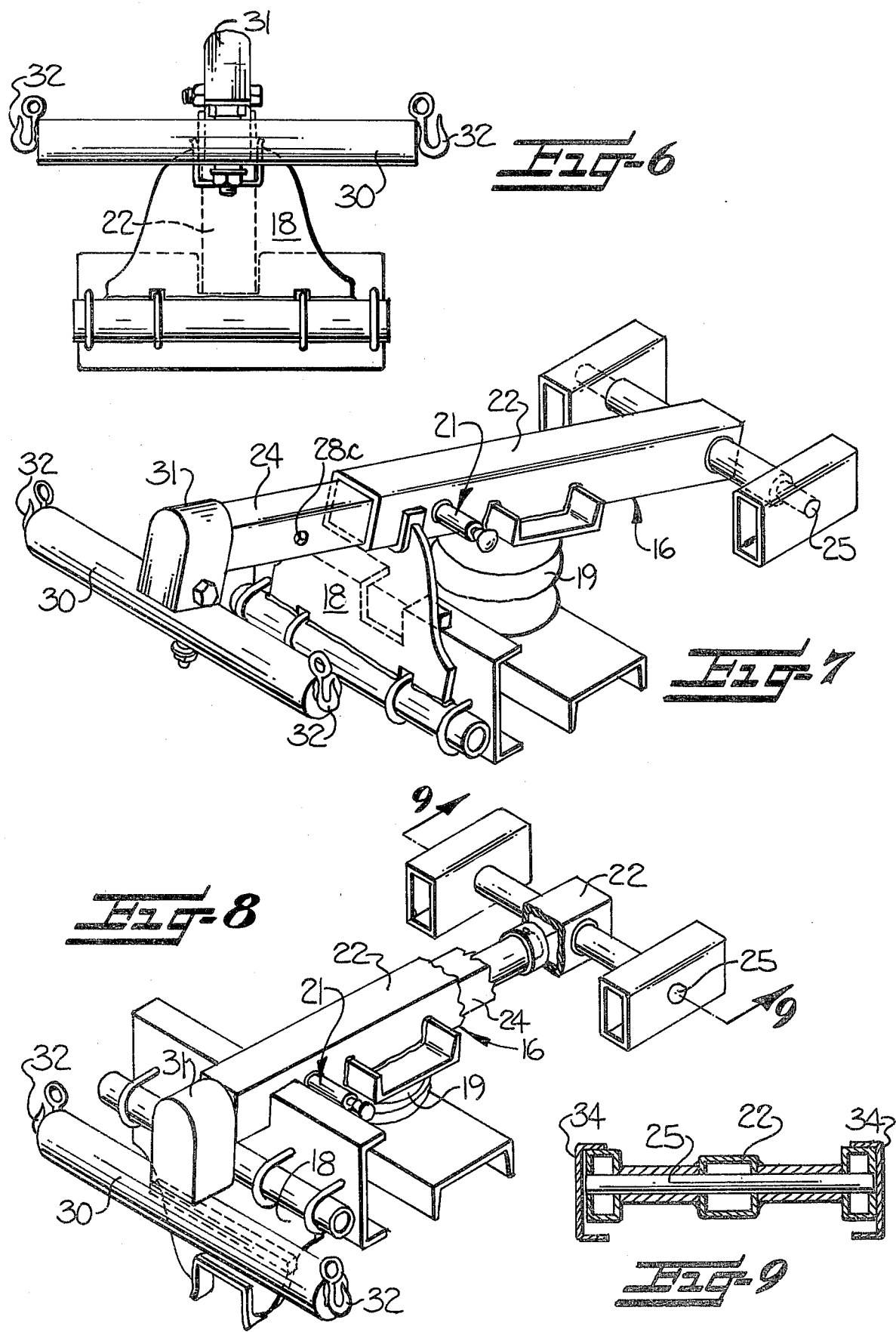

TOWING APPARATUS

This invention relates to an integral towing apparatus particularly suited for a towing vehicle, such as a trailer cab with a conventional fifth wheel coupler, to adapt the towing vehicle so as to be capable of towingly engaging at different times either a conventional trailer or an alternate type vehicle such as another trailer cab.

Heretofore, it has been the practice to use a separate and attachable towing apparatus to enable a towing vehicle such as a trailer cab when not towingly engaging a trailer to engage and transport an alternate vehicle such as another trailer cab, usually when the second trailer cab has become either inoperative or damaged. It has been a common practice for the trailer cab to tow a loaded trailer to a given destination, disengage the trailer and engage a trailer cab so as to transport the same back on the return trip. This type of utilization of the original trailer cab was found to be most efficient since a second towing vehicle was not required to be sent on a round-trip solely to engage and tow a disabled trailer cab back to the service facilities or headquarters of a trucking company.

Typically, when the trailer cab transported a trailer to a predetermined destination and the trailer was disengaged, the driver or other parties would assemble and attach a separate towing apparatus to the trailer cab so as to adapt it to transport a disabled trailer cab on the return trip. Such non-integral towing apparatus as has been known heretofore at its destination site typically required several hours or more of valuable driver and trailer cab time for assembly and securing to the trailer cab chassis, which could otherwise have been more profitably utilized.

The integral towing apparatus of this invention is of simple and inexpensive construction so that it does not interfere with the functioning of the trailer cab during normal operation, and it is safer in use than towing apparatus known heretofore since it is not hurriedly assembled and secured to the trailer cab subsequent to removing a trailer at the destination site. The integral towing apparatus is adapted to be carried at all times by the trailer cab and further adapted so that in the stowed position it will accommodate normal operation of the fifth wheel coupler of the trailer cab and in the towing position it will accommodate towing of an alternate type vehicle such as a second trailer cab.

It is therefore an object of the invention to provide a simple and reliable towing apparatus.

It is also an object of the invention to provide an apparatus integral with a towing vehicle which accommodates normal operation of the towing vehicle when in the stowed position and functions to tow an alternate vehicle when in the towing position.

It is another object of the invention to provide a simple and reliable towing apparatus which can be used as an integral part of a trailer cab and accommodate normal operation of the trailer cab when in the stowed position but allow the trailer cab to tow another trailer cab when in the towing position.

It is yet another object of the invention to provide a towing apparatus which when used in combination with a trailer cab will allow the trailer cab to quickly and safely towingly engage another trailer cab.

It is a further object of the invention to provide a towing apparatus which will result in significant savings in time required for a first trailer cab to towingly engage a second trailer cab.

It is a still further object of the invention to provide an integral towing apparatus for a first trailer cab which can be expeditiously operated by the driver to towingly engage a second trailer cab.

Some of the objects and advantages of the invention having been stated, others will appear when taken in connection with the accompanying drawings, in which:

FIG. 6 is a lifting end elevational view of the invention;

FIG. 7 is a perspective view of the invention in its towing position;

FIG. 8 is a perspective view of the invention in its stowed position; and

FIG. 9 is a transverse sectional view taken along line 9—9 of FIG. 8.

The towing apparatus of this invention comprises a boom means mounted on the chassis of a towing vehicle for movement from a stowed position to a towing position. The boom means when in the stowed position accommodates normal operation of the conventional fifth wheel coupling device of the towing vehicle and the boom means when in the towing position accommodates towing engagement of the towing vehicle with an alternate vehicle such as a disabled towing vehicle. Also provided by the towing apparatus of this invention are means for securing the boom means in the towing position.

Figure 1:
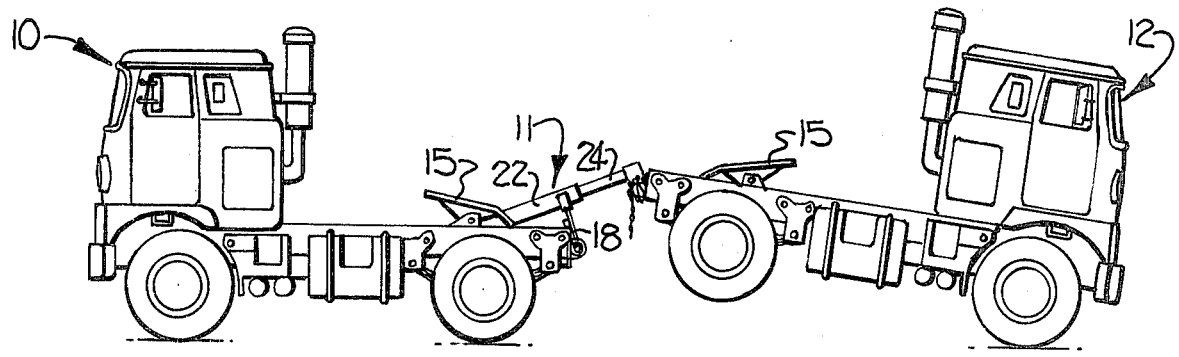
FIG. 1 is a side elevational view of a towing vehicle with the integral towing apparatus in towing engagement with a second towing vehicle.
Figure 2:
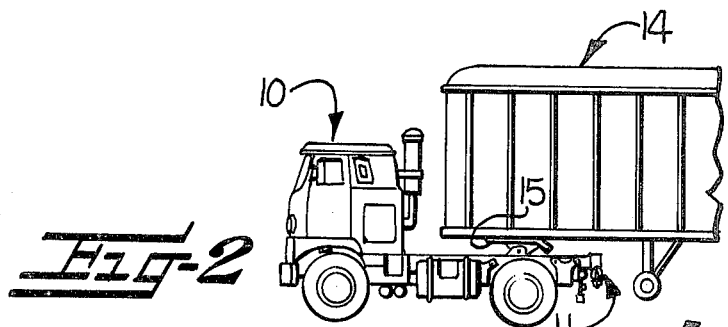
FIG. 2 is a side elevational view of a towing vehicle with the integral towing apparatus in conventional towing engagement with a trailer; p
Figure 3:
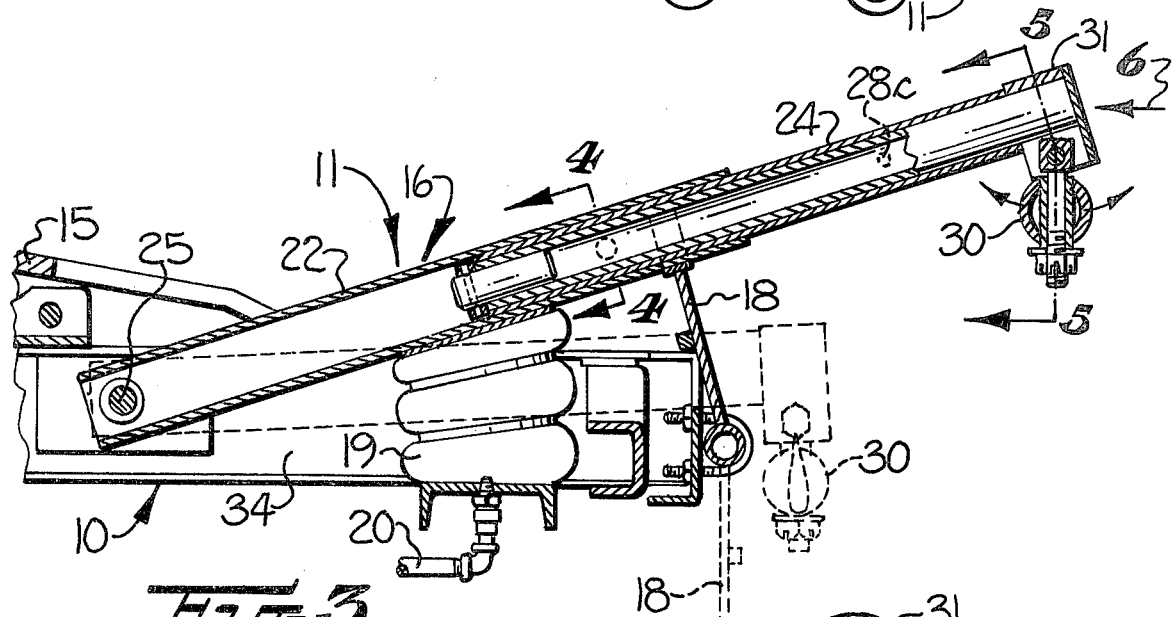
FIG. 3 is a vertical sectional view of the invention.

Referring now more specifically to the drawings, FIGS. 1 and 2 show the towing apparatus in combination with a towing vehicle and FIGS. 3 through 9 show a preferred embodiment of the towing apparatus according to the present invention.

In FIGS. 1 and 2, reference numeral 10 broadly indicates a towing vehicle such as a trailer cab, and wherein the integral towing apparatus of this invention, broadly indicated by reference numeral 11, is mounted to the chassis of the towing vehicle 10.

In FIG. 1, the towing vehicle 10 with the integral towing apparatus 11 mounted thereon is shown in towing engagement with a second towing vehicle or trailer cab, broadly indicated by reference numeral 12. FIG. 2 illustrates the towing vehicle 10 with the integral towing apparatus 11 of the invention mounted thereon in its stowed position so as to allow the towing vehicle to towingly engage a trailer, broadly indicated by reference numeral 14. Thus, FIG. 1 illustrates the integral towing apparatus 11 in its raised and extended towing position and FIG. 2 illustrates the towing apparatus 11 in its lowered and withdrawn stowed position so as to accommodate normal operation of the towing vehicle 10 in towing the trailer 14. The conventional coupler means for the towing vehicle is indicated by reference numeral 15 and comprises a fifth wheel type coupling device.

Referring now more specifically to the construction of the towing apparatus 11 as illustrated in FIGS. 3 through 9, it will be noted that the towing apparatus comprises a boom means, a means for securing the boom means in the towing position, a means for raising the boom means from the stowed position (FIG. 8) to the towing position (FIG. 7), and locking means for securing the boom means in either a withdrawn position or an extended position.

The boom means, generally indicated at 16, is of telescopic construction and comprises a first telescopic member 22 and a second telescopic member 24 wherein the first telescopic member 22 is pivotally mounted on a pivot member 25 extending transversely of the towing vehicle chassis and the second telescopic member 24 is slidably received by the first member and extensible therefrom. Therefore, it can be seen that the telescopic boom means 16 is pivotally mounted for movement from lowered and withdrawn positions while in the stowed position to raised and extended positions while in the towing position. The elements of the boom means are fixed together in an appropriate manner to transmit the force necessary to tow the towed vehicle.

The means for securing the telescopic boom means 16 in the towing position comprises a brace member 18 pivotally mounted on the chassis of the towing vehicle 10 and adapted for positioning in supporting engagement with the telescopic boom means 16 when the boom means is in the raised towing position. There is a weight distributing bar on one side of the brace member 18 to facilitate distributing the towing force on the brace member to the chassis of the towing vehicle 10. The means for raising the telescopic boom means 16 from the stowed position to the towing position preferably is a fluid pressure actuated device, such as an air suspension bag 19, which is positioned between the telescopic boom means 16 and the chassis of the towing vehicle 10 so as to raise the telescopic boom means 16 into the towing position when actuated. An air line 20 communicates with the air suspension bag 19 to provide a conduit for air pressure to activate the air bag. While the drawing shows a single air bag 19, it is contemplated that one or more fluid pressure or mechanically actuated devices of whatever type desired may be used.

Figure 4:
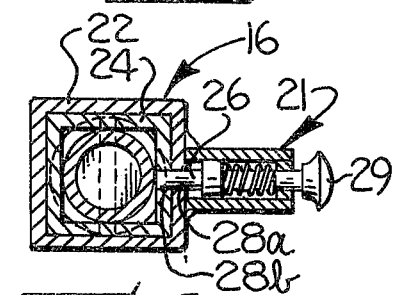
FIG. 4 is a transverse sectional view taken along line 4—4 of FIG. 3.

Referring now specifically to FIG. 4, the locking means, generally indicated at 21, fixedly secures the first and second telescopic members 22 and 24, respectively, at different times in withdrawn and extended relative positions. Preferably, the locking means 21 comprises a rod member 26 which is urged into an aperture 28a in telescopic member 22 and further urged into either one of two apertures 28b and 28c positioned along the longitudinal length of the second telescopic member 24 which is slidably received by the first telescopic member 22. If apertures 28a and 28b are aligned, the telescopic boom means 16 can be locked in the extended position by extending rod member 26 therethrough. Whereas, to lock the telescopic boom means in the withdrawn position, the rod member 26 must be slidably received by aligned apertures 28a and 28c.

The rod member 26 of the locking means 21 has a handle 29 on the end thereof remote from the telescopic member 22 so as to facilitate pulling the rod member from engagement with one of the apertures 28b or 28c of second telescopic member 24 and allowing for sliding of the second telescopic member 24 until the other aperture therein is aligned with the single aperture 28a in the first telescopic member 22. At this relative position, the rod member 26 is slidingly received by both aligned apertures and locks the telescopic boom means 16 into the second of the two positions, extended or withdrawn.

Figure 5:
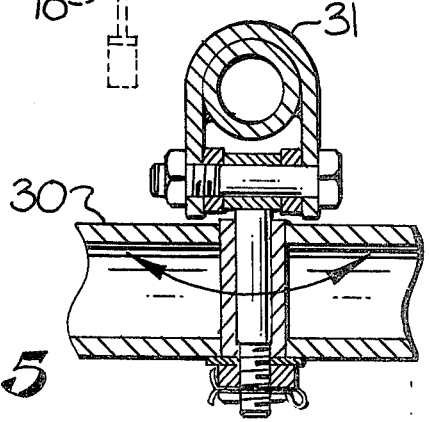
FIG. 5 is a transverse sectional view taken along lines 5—5 of FIG. 3.

As best shown in FIGS. 5 and 6, the telescopic boom means 16 has an accessory lifting member 30 mounted transversely of the second telescopic member 24 of the boom means 16 for accommodating the attachment of lifting chains to facilitate the lifting and towing of a second towing vehicle such as a trailer cab. The accessory lifting member 30 is connected to the second telescopic member 24 by means of a universal swivel connection 31 that permits the accessory lifting member to rotate and pivot about multiple axes in accommodation of the motions necessary between a towed and towing vehicle. The accessory lifting member 30 provides stability and means for securing a plurality of chains in a lateral fashion to a disabled towing vehicle or trailer cab 12 to be partly lifted from contact with the road surface and towed by the towing vehicle 10.

Typically, the towing vehicle 10 on one leg of a round trip would transport a trailer 12 connected by means of the conventional fifth wheel coupler 15 associated with the towing vehicle 10. The towing apparatus 11 of this invention would be in its stowed position so as to accommodate normal operation of the fifth wheel coupling device 15. Before beginning another leg of a trip, the towing vehicle 10 would disengage the trailer 14 and subsequently towingly engage, for example, a disabled trailer cab 12. Alternatively, a towing vehicle 10 in combination with the integral towing apparatus could be utilized solely to travel to the location of an inoperative or disabled second towing vehicle 12 and towingly engage the latter with the integral towing apparatus 11 of this invention and transport the inoperative towing vehicle 12 to a servicing site.

The integral towing apparatus 11 as arranged in its towing position can best be seen in FIG. 7. The telescopic boom means 16 has been raised to its towing position by the air bag 19, and the second telescopic member 24 has been pulled longitudinally outwardly into an extended position from the first telescopic member 22. The locking means 21 secures the telescopic boom means 16 in the extended position as rod member 26 has been slidingly received within the aligned apertures 28a and 28b situated within the most proximate walls of the first and second telescopic members, 22 and 24 respectively. The brace member 18 has been pivoted from its downwardly extending position (phantom lines in FIG. 3) into supporting engagement with the telescopic boom means 16. In this supportive position, the brace member 18 at least in part supports the telescopic boom means 16 and the load borne thereby in the towing position, relieving the air bag 19 from the necessity of being pressurized so as to contribute to longer life for the air bag and avoid any catastrophic failure or blowout. The telescopic boom means 16 may also be supported in part by the air bag 19 positioned between the chassis of the towing vehicle 10 and the telescopic boom means 16, should that be appropriate or desired.

The first telescopic member 22 of the telescopic boom means 16 is pivotally mounted on pivot member 25 which extends transversely of the chassis of the towing vehicle 10. Also to be noted regarding the towing apparatus 11 is the accessory lifting member 30 mounted transversely of the second telescopic member 24 for accommodating the attachment of lifting chains to facilitate towing of the alternate vehicle or trailer cab 12. The lifting chains can be wrapped around the accessory lifting member 30 or fastened to the engaging hooks 32 affixed on both ends of the accessory lifting member 30.

Normally, when the integral towing apparatus 11 of this invention is in the towing position illustrated in FIG. 7 and FIG. 1, the disabled towing vehicle 12 will be towingly engaged in such a manner that it will be transported with its rear chassis and wheels lifted upwardly and out of contact with the adjacent road surface and the chassis adjacent the rear chassis of the towing vehicle 10. This, of course, is to facilitate the lifting and towing of the disabled towing vehicle 12 since most of its weight is distributed toward the front thereof.

FIG. 8 best illustrates the towing apparatus 11 of this invention in its stowed position on the towing vehicle 10 so as to accommodate normal operation of its conventional fifth wheel coupling device 15 in towing trailer 14. The telescopic boom means 16 has been lowered and withdrawn, and the brace member 18 has been pivoted downwardly so as not to be in supporting engagement with the telescopic boom means 16. The locking means 21 has secured the second telescopic member 24 within the first telescopic member 22 with the rod member 26 having been slidably received by the aligned apertures 28a and 28c.

Best illustrated in FIG. 9 are the structure and support for the pivot member 25 which extends transversely of the chassis of the towing vehicle, the chassis designated by reference numeral 34 in FIG. 9, and is secured to the chassis at either end of the pivot member 25. The first telescopic member 22 can be observed as supported on the pivot member 25 and pivoted thereon so as to allow for movement of the telescopic boom means 16 from the lowered position while in the stowed position to the raised position while in the towing position.

In operation, the operator would first position trailer cab 10 adjacent the rear of a second trailer cab 12. After disengaging the locking means 21, the second telescopic member 24 would be pulled longitudinally outwardly from within the first telescopic member 22 and tow chains would be wrapped around the rear chassis of disabled trailer cab 12 and secured to the engaging hooks 32 affixed to each end of the accessory lifting member 30. Next, the operator would activate an air source to supply air pressure through the air line 20 to the air bag 19 so as to elevate the laterally extended telescopic boom means 16 and the rear chassis of trailer cab 12 secured thereto. To secure telescopic boom means 16 in the raised and extended position, support member 18 would be pivoted into supporting engagement with the boom means. The driver of trailer cab 10 could then proceed to safely tow the trailer cab 12 to a desired destination for servicing or repair.

It will thus be seen that there is provided, as described hereinbefore, a simple and reliable towing apparatus which can be used in combination with a towing vehicle so as to effect a towing of a second towing vehicle as may be required. More specifically, an integral towing apparatus is provided for use by a conventional trailer cab with a conventional fifth wheel coupler to expeditiously engage a disabled second trailer cab and transport the same to a remote location for servicing.

In the drawings and specification, there has been set forth a preferred embodiment of the invention, and although specific terms are employed, they are used in a generic and descriptive sense only and not for purposes of limitation.

That which is claimed is:

1. In combination with a towing vehicle having a conventional fifth wheel coupling device for towing a trailer, an integral secondary towing apparatus for towing an alternate type vehicle comprising: extensible boom means mounted on said towing vehicle for pivotal movement from a stowed position lowered beneath and withdrawn forwardly toward said coupling device to a towing position raised above and extended rearwardly away from said coupling device, said boom means when in said stowed position accommodating normal operation of the coupling device and said boom means being extensible for accommodating towing engagement thereof with the alternate vehicle when in said towing position; and a brace member for securing said boom means in the towing position, said brace member being pivotally mounted on the chassis of the towing vehicle for positioning in supporting engagement with said boom means when said boom means is in the towing position; whereby the towing vehicle can at different times be towingly coupled with the trailer and the alternate type vehicle.

2. A combination towing vehicle and integral secondary towing apparatus as claimed in claim 1, including a means for raising said extensible boom means from the stowed position to the towing position, said means for raising at least in part supporting said boom means.

3. A combination towing vehicle and integral secondary towing apparatus as claimed in claim 2, wherein said means for raising the boom means comprises a fluid pressure actuated device acting between said boom means and the chassis of the towing vehicle.

4. A combination towing vehicle and integral secondary towing apparatus as claimed in claim 2, wherein said means for raising said boom means comprises an air suspension bag, said air suspension bag being positioned between said boom means and the chassis of the towing vehicle.

5. In combination with a first towing vehicle with a conventional fifth wheel coupling device for towing a trailer, an integral secondary towing apparatus for towing a second towing vehicle comprising:

telescopic boom means mounted on said first towing vehicle for pivotal movement from a stowed position lowered beneath and withdrawn forwardly toward said coupling device to a towing position raised above and extended rearwardly away from said coupling device, said boom means when in said stowed position accommodating normal operation of the coupling device and said boom means being extensible for accommodating towing engagement thereof with the second towing vehicle when in said towing position;

an accessory lifting member mounted transversely of the extensible portion of said boom means for accommodating the attachment of lifting chains to facilitate towing of the second towing vehicle;

a brace member for securing said boom means in the towing position, said brace member being pivotally mounted on the chassis of the first towing vehicle for positioning in supporting engagement with said boom means when said boom means is in the towing position; and means for raising said extensible boom means from the stowed position to the towing position, said means for raising at least in part supporting said boom means;

whereby the first towing vehicle can at different times be towingly coupled with the trailer and the second towing vehicle.

6. A combination towing vehicle and integral secondary towing apparatus as claimed in claim 5, including a pivot member extending transversely of the chassis of the first towing vehicle.

7. A combination towing vehicle and integral secondary towing apparatus as claimed in claim 6, wherein said telescopic boom means comprises first and second telescopic members, said first telescopic member being pivotally mounted on said pivot member extending transversely of the chassis and said second telescopic member being slidably received by said first member and extensible therefrom.

8. A combination towing vehicle and integral secondary towing apparatus as claimed in claim 7, including locking means for fixedly securing the first and second telescopic members at different times in a withdrawn and an extended position.

9. A towing vehicle convertible from towing a trailer to towing an alternate type vehicle, said towing vehicle comprising:
   a chassis;
   fifth wheel coupler means secured to said chassis for engaging a trailer;
   extensible boom means mounted on said chassis for pivotal movement from a stowed position lowered beneath and withdrawn forwardly toward said coupling device to a towing position raised above and extended rearwardly away from said coupling device, said boom means when in said stowed position accommodating normal operation of the coupling device and said boom means being extensible for accommodating towing engagement thereof with the alternate vehicle when in said towing position; and
   a brace member for securing said boom means in the towing position, said brace member being pivotally mounted on said chassis for positioning in supporting engagement with said boom means when said boom means is in the towing position;

whereby the towing vehicle can at different times be towingly coupled with the trailer and the alternate type vehicle.

10. A convertible towing vehicle as claimed in claim 9, including a pivot member extending transversely of said chassis of the towing vehicle.

11. A convertible towing vehicle as claimed in claim 9, including locking means for fixedly securing said extensible boom at different times in the withdrawn and the extended positions.

12. A convertible towing vehicle as claimed in claim 9, including a means for raising said extensible boom means from the stowed position to the towing position, said means for raising at least in part supporting said boom means.

13. A convertible towing vehicle as claimed in claim 12, wherein said means for raising said boom means comprises a fluid pressure actuated device acting between said chassis and said boom means.

14. A convertible towing vehicle as claimed in claim 12, wherein said means for raising the boom means comprises an air suspension bag, said air suspension bag being positioned between said chassis and said boom means.

15. An accessory towing apparatus adapted for installation on and use with a towing vehicle having a conventional fifth wheel coupling device for towing a trailer, said apparatus comprising:
   a pivot member for installation extending transversely of the chassis of a towing vehicle;
   extensible boom means pivotally mounted on said pivot member for pivotal and extending movement from a stowed position in which said boom means is lowered beneath and withdrawn forwardly toward said coupling device to a towing position in which said boom means is raised above and extended rearwardly away from said coupling device, said boom means while in stowed position accommodating normal operation of the towing vehicle and said boom means while in said towing position accommodating towing engagement thereof with an alternate vehicle;
   an accessory lifting member mounted transversely of said boom means for accommodating the attachment of lifting chains to facilitate towing of the alternate vehicle; and
   means for raising said extensible boom means from the stowed position to the towing position, said means for raising at least in part supporting said boom means;

whereby the towing apparatus can at different tmes be towingly coupled with the alternate vehicle when in the towing position and stowed for normal functioning of the towing vehicle when in the stowed position.

16. An accessory towing apparatus as claimed in claim 15, including locking means for fixedly securing said extensible boom at different times in the withdrawn and the extended positions.

* * * * *